United States Patent [19]

Kameya et al.

[11] 4,218,501

[45] Aug. 19, 1980

[54] ELECTROSTATIC FLOCK-COATED METAL SHEET WITH EXCELLENT CORROSION RESISTANCE AND FABRICABILITY

[75] Inventors: Toru Kameya, Ichikawa; Yuji Aoyama, Tokyo, both of Japan

[73] Assignee: Taiyo Steel Co., Ltd., Japan

[21] Appl. No.: 12,194

[22] Filed: Feb. 14, 1979

[51] Int. Cl.$^2$ ........................... C09J 7/00; B44D 1/44

[52] U.S. Cl. ........................................ 428/90; 428/95; 428/96; 428/215

[58] Field of Search ...................... 428/90, 95, 215, 96

[56] References Cited

U.S. PATENT DOCUMENTS 3,502,207 3/1970 Alexander ............................ 428/90

*Primary Examiner*—Marion McCamish

*Attorney, Agent, or Firm*—Wenderoth, Lind & Ponack

[57] ABSTRACT

Flock-coated metal sheet with excellent corrosion resistance and fabricability produced by applying an anticorrosive synthetic resin containing an anticorrosive pigment on the surface of a metal sheet such as a steel sheet to obtain an anticorrosive synthetic resin layer with a dried film thickness of 2 to 20 microns, coating said synthetic resin layer partially or completely with an elastic adhesive with a dried film thickness of 50 to 500 microns, and electrostatically flock-coating synthetic resin pile on said adhesive layer.

3 Claims, 1 Drawing Figure

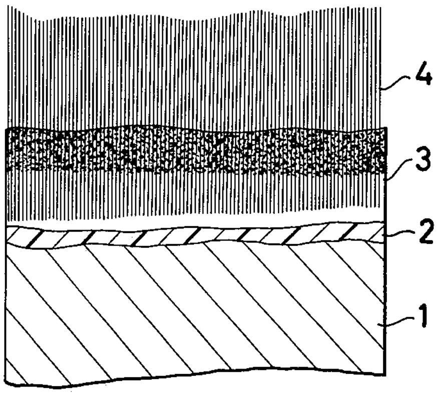
4
3
2
1

ELECTROSTATIC FLOCK-COATED METAL SHEET WITH EXCELLENT CORROSION RESISTANCE AND FABRICABILITY

BACKGROUND OF THE INVENTION

1. Field of the Invention

The present invention relates to a flock-coated metal sheet with excellent corrosion resistance and fabricability, having an anticorrosive synthetic resin layer containing an anticorrosive pigment on the surface of a metal sheet, such as a steel sheet, an elastic adhesive layer on said synthetic resin layer, and a synthetic resin pile planted on said adhesive.

2. Description of Prior Art

It has been a common practice to deposit piles electrostatically on the surface of a cloth, paper, synthetic film and the like. The electrostatic flock-coating of pile on the surface of a plywood has also been well known. However, the former group is not a complete structural material in itself, so that the flock-coated articles thus obtained must be put on the surface of a base material in using them as a panel and the like. The latter is a complete structural material in itself and can directly be used as panels, but can not be subjected to the subsequent forming such as drawing and bending. Moreover, its use as a building material is limited owing to its inflammability. The electrostatic flock-coating is applied also frequently to the articles such as vanity cases and formed metal articles to provide them a beautiful appearance.

However, the conventional process to obtain a flock-coated product is very complicated. For instance, metal or wood is formed to a desired shape previously, an adhesive is applied to the portion where the flock-coating is to be done with the use of a spray, a brush or the like, and then the electrostatic flock-coating is effected. Moreover, in the case when the shape of the formed article is complicated and irregular, the amounts of adhesive at convex portions are less as compared with those at concave portions, so that the pile density at the convex portions becomes far smaller than the density at the concave portions to give an uneven flock-coated surface, losing the beautiful appearance of finished products. Therefore, the conventional application of electrostatic flock-coating after forming is disadvantageous from the standpoints of workability and cost as well as quality.

SUMMARY OF THE INVENTION

Therefore, one of the objects of the present invention is to offer a new flock-coated metal sheet having excellent fabricability, superior corrosion and abrasion resistances and good adherence, and having further a soft feeling by eliminating the drawbacks in the conventional methods and the new metal sheet of the invention comprises an anticorrosive synthetic resin layer containing an anticorrosive pigment in a dried film thickness of 2 to 20 microns on a partial or whole surface of a metal sheet surface, an elastic adhesive in a dried film thickness of 50 to 500 microns on the anticorrosive layer, and a snythetic resin pile electrostatically flock-coated on the adhesive layer.

The present flock-coated metal sheet can satisfactorily be produced by applying a specified adhesive on the surface of a flat metal sheet uniformly by roll coating or the like, and subjecting the sheet thus coated directly to electrostatic flock-coating, so that the surface obtained is quite uniform and beautiful. Since the metal sheet thus coated is excellent in its fabricability, it can freely and easily be subjected to severe forming conditions, such as bending and drawing, and there is no need of applying electrostatic flock-coating process after the formings. Furthermore, since the metal sheet thus coated itself has a sufficient strength, it can be used in various applications such as appliances and building panels with no use of a reinforcing material. Thus, the technical and economical advantages of the present invention are very large.

The present invention is to offer a flock-coated metal sheet having simultaneously excellent fabricability, adherence and corrosion resistance, which can by no means be achieved by the conventional methods.

BRIEF DESCRIPTION OF THE DRAWING

The FIGURE shows cross-sectional structure of a flock-coated metal sheet according to the present invention.

DETAILED DESCRIPTION OF THE INVENTION

Now, the present invention will be explained by referring to the attached drawing.

in the FIGURE, 1 is a cold rolled steel sheet, 2 is an anticorrosive synthetic resin layer, 3 is an adhesive layer and 4 is synthetic resin piles.

A metal sheet used in the present invention means a cold rolled steel sheet, a galvanized steel sheet, an aluminum-plated steel sheet, a copper sheet, an aluminum sheet, usually in a thickness of 0.2 to 2.0 mm and having sufficient fabricability and strength. The surface of the metal sheet is desirously degreased in order to assure good adhesion of the anticorrosive synthetic resin to the metal sheet and further subjected to a pretreatment, such as chemical treatments with use of phosphoric acid or chromic acid.

The elastic anticorrosive synthetic resin to be applied on the metal sheet should have a sufficient fabricability and give an anticorrosion effect to the metal sheet. It is most desirable to use an anticorrosive primer comprising a resin, such as epoxy resin, phenol resin, polyester resin, urethane resin, and an anticorrosive pigment, such as zinc chromate and strontium chromate with a ratio of 2 to 30 parts by weight of the pigment per 100 parts by weight of the resin and the thickness of the anticorrosive layer should be 2 to 20 microns as a dried film.

The reason why the amount of the anticorrosive pigment is restricted within 2 to 30 parts per 100 parts of the resin is that amounts less than 2 parts do not give required flexibility and corrosion resistance to the metal sheet, and on the other hand, more than 30 parts of the pigment has no effect for further improvement of the anticorrosion effect, renders the synthetic resin layer permeable to water, and rather has a tendency to reduce the elasticity of the synthetic resin causing a bad influence on the fabricability.

When the dried film thickness of the anticorrosive synthetic resin layer is less than 2 microns, the effect of the presence of said layer on the elasticity and the corrosion resistance of the product can hardly be expected. On the other hand, when the thickness exceeds 20 microns, no further effect of improving the corrosion resistance can be expected and the fabricability is rather lowered, so that to provide an anticorrosive synthetic resin layer with a dried film thickness of more than 20 microns has no chemical significance and only adverse effects. This is the reason why the film thickness of the anticorrosive synthetic resin layer is limited to the range of from 2 to 20 microns as a dried film.

To provide an intermediate anticorrosive synthetic resin layer between the metal sheet and the adhesive layer has moreover the effect of preventing the lowering of the adhesion strength between the metal sheet and the adhesive directly in contact with each other due to the chemical properties of a certain kind of emulsion type adhesive, particularly to the oxidation-reduction reaction with the metal sheet in a certain pH range.

In considering the use of a flock-coated metal sheet for various purposes, an adhesive used in the present invention is required to have excellent resistance against water, acid pickling and abrasion, and further superior elasticity and adhesion properties. Particularly, for the purpose of forming, it is required that the elasticity and adhesion property be very superior.

According to results of extensive investigations conducted by the present inventors, it is recommended to use an adhesive having excellent flexibility, adhesion property and water resistant properties, such as a styrene-butadiene type synthetic rubber adhesive and an emulsion type adhesive comprising a three-dimensional copolymer of ethylene, vinyl acetate and an ethylenic unsaturated acid, of which the latter being disclosed in Japanese Patent Publication No. Sho 46-733. Although epoxy type and urethane type adhesives are excellent in the adhesion strength, they are lacking of flexibility, causing dangers such as destruction of the adhesive layer, cracks on the flock-coated surface and peel-off of the flock-coated layer from the metal sheet in the formings, such as drawing and bending, so that they are not suitable in applications where they are subjected to further forming.

The thickness of the adhesive layer may be changed according to the shape (denier and length) of the synthetic resin piles to be planted, but the suitable range is within 50 to 500 microns as a dried film.

When the thickness of the adhesive layer is thinner than this range, the adhesion strength of the adhesive layer to the synthetic resin pile is insufficient, and the pile density is so low as to deteriorate the surface appearance and to lower the abrasion resistance. As a consequence, such troubles as the falling-off of piles take place at portions of the flock-coated surface which contact with dies in the deep drawing. When the thickness of the adhesive layer is thicker than this range, the synthetic resin pile is buried in the adhesive layer, deteriorating the surface appearance and feeling and increasing the production cost; hence causing a great economical disadvantage.

The term synthetic resin pile, as employed in the present invention, means short fibers of a synthetic resin, such as nylon, acrylic and rayon, usually with 1 to 20 deniers and a length of 0.5 to 5 mm. The quality and size of the synthetic resin piles may suitably be selected according to the object and the condition of application.

Now, the examples of the present invention will be described hereinbelow together with the comparative examples.

EXAMPLE 1

A cold rolled steel sheet with a thickness of 0.27 mm was degreased, subjected to a phosphoric acid treatment, and coated with an epoxy resin solution containing 5 parts by weight of zinc chromate per 100 parts of the resin with a thickness of 5 microns as a dried film. The resin was hardened by heating to obtain an anticorrosive synthetic resin layer. An emulsion type styrene-butadiene synthetic rubber adhesive was applied on the synthetic resin layer in a thickness of 80 microns as a dried film, immediately acrylic resin pile of 2 deniers and a length of 0.8 mm was planted thereon by means of an electrostatic flock-coating machine, and the adhesive was hardened under a drying condition of 150° C. for 3 min. to obtain a flock-coated metal sheet. The manufacturing conditions and the structural components and properties of the resultant products are shown in Tables 1 and 2.

EXAMPLE 2

A galvanized steel sheet with a thickness of 0.4 mm was degreased, subjected to a chromic acid treatment, and coated with a polyester resin solution containing 20 parts by weight of zinc chromate per 100 parts of the resin with a thickness of 10 microns as a dried film. The resin was hardened by heating to obtain an anticorrosive synthetic resin layer. An emulsion type adhesive of a three-dimensional copolymer of ethylene was applied on the synthetic resin layer in a thickness of 100 microns as a dried film, immediately nylon pile of 3 deniers and a length of 0.8 mm was planted thereon by means of an electrostatic flock-coating machine, and the adhesive was hardened under a drying condition of 150° C. for 4 min. to obtain a flock-coated metal sheet. The manufacturing condition and the structural components and properties of the product are shown in Tables 1 and 2.

EXAMPLE 3

An aluminum-plated steel sheet with a thickness of 0.6 mm was degreased, subjected to a chromic acid treatment, and coated with a polyester resin solution containing 10 parts by weight of strontium chromate per 100 parts of the resin with a thickness of 15 microns as a dried film. The resin was hardened by heating to obtain an anticorrosive synthetic resin layer. An emulsion type adhesive of a three-dimensional copolymer of ethylene was applied on the synthetic resin layer with thickness of 300 microns as a dried film, immediately nylon pile of 4 deniers and a length of 2.0 mm was planted thereon by means of an electrostatic flock-coating machine, and the adhesive was hardened under a drying condition of 150° C. for 4 min. to obtain a flock-coated metal sheet. The manufacturing condition and the structural components and properties of the product are shown in Tables 1 and 2.

EXAMPLE 4

An aluminum sheet with a thickness of 0.8 mm was degreased, subjected to a chromic acid treatment, and coated with an epoxy resin solution containing 15 parts by weight of strontium chromate per 100 parts of the resin in a dried film thickness of 3 microns. The resin was hardened by heating to obtain an anticorrosive synthetic resin layer. A styrene-butadiene synthetic rubber adhesive was applied on said synthetic resin layer in a thickness of 150 microns as a dried film, immediately acrylic resin pile of 4 deniers and a length of 1.5 mm was planted thereon by means of an electrostatic flock-coating machine, and the adhesive was hardened under a drying condition of 150° C. for 8 min. to obtain a flock-coated metal sheet. The manufacturing condition and the structural components and the properties of the product are shown in Tables 1 and 2.

COMPARISON EXAMPLE 1

A cold rolled steel sheet with a thickness of 0.3 mm was degreased, subjected to a phosphoric acid treatment, and coated with an acrylic resin solution containing 5 parts by weight of zinc chromate per 100 parts of the resin in a dried film thickness of 10 microns. The resin was hardened by heating to obtain an anticorrosive synthetic resin layer. An urethane resin adhesive was applied on said synthetic resin layer in a dried film thickness of 20 microns, immediately acrylic pile of 2 deniers and a length of 0.8 mm was planted thereon by means of an electrostatic flock-coating machine, and the adhesive was hardened under a drying condition of 180° C. for 2 min. to obtain a flock-coated metal sheet. In this example, particularly the thickness of the dried adhesive layer was thinner than the range defined in the present invention. The manufacturing condition and the structural components and the properties of the product are shown in Tables 1 and 2.

COMPARISON EXAMPLE 2

A cold rolled steel sheet with a thickness of 0.5 mm was degreased, subjected to a phosphoric acid treatment, and coated with an epoxy resin solution containing 5 parts by weight of strontium chromate per 100 parts of the resin with a dried film thickness of 5 microns. The resin was hardened by heating to obtain an anti-corrosive synthetic resin layer. An epoxy resin adhesive was applied on said synthetic resin layer in a dried film thickness of 100 microns, immediately nylon pile of 3 deniers and a length of 0.8 mm was planted thereon by means of an electrostatic flock-coating machine, and the adhesive was hardened under a drying condition of 180° C. for 2 min. to obtain a flock-coated metal sheet. The manufacturing condition and the structural components and the properties of the product are shown in Tables 1 and 2.

COMPARISON EXAMPLE 3

A galvanized steel sheet with a thickness of 1.0 mm was degreased, coated with a vinyl acetate adhesive in a dried film thickness of 500 microns, and immediately subjected to the planting of acrylic resin pile of 3 deniers and a length of 0.8 mm on the adhesive layer by means of a flock-coating machine. The adhesive was hardened under a drying condition of 150° C. for 10 min. to obtain a flock-coated metal sheet. The product of this example had no anticorrosive synthetic resin layer. The manufacturing condition and the structural components and the properties of the product are shown in Tables 1 and 2.

COMPARISON EXAMPLE 4

A galvanized steel sheet with a thickness of 0.8 mm was subjected to degrease and phosphoric acid treatments, coated with an epoxy resin adhesive in a dried film thickness of 30 microns and immediately nylon pile of 5 deniers and a length of 2.5 mm was planted thereon by means of an electrostatic flock-coating machine. The adhesive was hardened under the drying condition of 180° C. for 5 min. to obtain a flock-coated metal sheet. The manufacturing condition and the structural components and the properties of the product will be shown in Tables 1 and 2.

COMPARISON EXAMPLE 5

An aluminum-plated steel sheet with a thickness of 1.2 mm was degreased, coated with an epoxy resin adhesive in a dried film thickness of 40 microns, immediately nylon pile of 5 deniers and a length of 2.5 mm was planted thereon by means of an electrostatic flock-coating machine, and the adhesive was dried and hardened under a condition of 150° C. for 10 min. to obtain a flock-coated metal sheet. The manufacturing condition and the structural components and the properties of the product are shown in Tables 1 and 2.

Table 1

Structure and Manufacturing Condition

| Example | | Metal sheet: Kind | Metal sheet: Thickness (mm) | Metal sheet: Surface treatment | Anticorrosive synthetic resin layer: Anticorrosive pigment | Anticorrosive synthetic resin layer: Synthetic resin |
|---|---|---|---|---|---|---|
| Present Invention | No. 1 | Cold rolled steel sheet | 0.27 | Phosphoric acid | Zinc chromate | Epoxy resin |
| | No. 2 | Galvanized steel sheet | 0.4 | Chromic acid | Zinc chromate | Polyester resin |
| | No. 3 | Aluminum-plated steel sheet | 0.6 | Chromic acid | Strontium chromate | Polyester resin |
| | No. 4 | Aluminum sheet | 0.8 | Chromic acid | Strontium chromate | Epoxy resin |
| Comparison | No. 1 | Cold rolled steel sheet | 0.3 | Phosphoric acid | Zinc chromate | Acrylic resin |
| | No. 2 | Cold rolled Steel sheet | 0.5 | Phosphoric acid | Strontium cromate | Epoxy resin |
| | No. 3 | Galvanized steel sheet | 1.0 | — | — | — |
| | No. 4 | Galvanized steel sheet | 0.8 | Phosphoric acid | — | — |
| | No. 5 | Aluminum-plated steel sheet | 1.2 | — | — | — |

| Example | Thickness (μ) | Adhesive: Kind | Adhesive: Thickness (μ) | Pile: Kind | Pile: Denier | Pile: Length (mm) |
|---|---|---|---|---|---|---|

Table 1-continued

| Structure and Manufacturing Condition | | | | | | |
|---|---|---|---|---|---|---|
| No. 1 | 5 | Styrene-butadiene rubber | 80 | Acrylic | 2 | 0.8 |
| No. 2 | 10 | Emulsion type adhesive of a three-dimensional copolymer of ethylene | 100 | Nylon | 3 | 0.8 |
| No. 3 | 15 | Emulsion type adhesive of a three-dimensional copolymer of ethylene | 300 | Nylon | 4 | 2.0 |
| No. 4 | 3 | Styrene-butadiene rubber | 150 | Acrylic | 4 | 1.5 |
| No. 1 | 10 | Urethane resin | 20 | Acrylic | 2 | 0.8 |
| No. 2 | 5 | Epoxy resin | 100 | Nylon | 3 | 0.8 |
| No. 3 | — | Vinyl acetate | 500 | Acrylic | 3 | 0.8 |
| No. 4 | — | Epoxy resin | 30 | Nylon | 5 | 2.5 |
| No. 5 | — | Epoxy resin | 40 | Nylon | 5 | 2.5 |

Testing Methods (1) Corrosion resistance test (Salt water spray test): According to JIS Z2371
Test time: 500 hours
Evaluation:
O—No occurrence of rust
X—Rust occurs (2) Cylinder deep drawing test:
Diameter of die: 42ϕ
Diameter of punch: 40ϕ
R of punch shoulder: 8 R
Depth of drawing: 30 mm (3) 90° bending test: 90° OR processing by an impact with a bend tester (4) Boiling water test: Test pieces were immersed in a boiling water for 1 hour and cooled spontaneously. Observation of the surface appearance and 180° adhesion test by a vise.

(5) Spiral scoring Erichsen test: After the test with a load of 500 g, the flock-coated surface is observed.
Evaluation:
O—No abnormality
Δ—Some peeling-off
X—Remarkable peeling-off (6) Planted-pile density test: Evaluation with the naked eye after electrostatic pile planting.

As obvious from the result of various tests in the above, the flock-coated metal sheets of the present invention have excellent adhesion property, excellent fabricability as well as excellent corrosion resistance. It is obvious that various properties of the present flock-coated metal sheets, such as adhesion strength, fabricabilities and corrosion resistance are markedly improved by providing an intermediate anticorrosive synthetic resin layer of a specific thickness, having excellent adhesion property and corrosion resistance between the metal sheet and the adhesive layer.

The present flock-coated metal sheets are not only excellent for the use in building construction such as panels, ceilings, walls, partition walls and doors as an inflammable material, but also have superior properties for the formings such as deep drawing, roll forming and bending which can not be obtained by the conventional flock-coated products such as plywood products obtained by the electrostatic pile planting. The present flock-coated metal sheets are excellent complex materials which can be subjected to various complicated processings to produce kitchen wares, business instruments, toys, casings and so on.

What is claimed is:

1. A flock-coated metal sheet with excellent corrosion resistance and fabricability, comprising (a) an anti- Table 2

| Example | Testing Article | Anti-corrosion test (Salt water spraying | Cylinder deep drawing test | 90° Bending test | Boiling water test: Appearance | Boiling water test: Bending | Spiral scoring Erichsen test | Planted-pile density test |
|---|---|---|---|---|---|---|---|---|
| Present Invention | No. 1 | 0 | good | good | good | good | 0 | dense |
| | No. 2 | 0 | good | good | good | good | 0 | dense |
| | No. 3 | 0 | good | good | good | good | 0 | dense |
| | No. 4 | 0 | good | good | good | cracked | 0 | dense |
| Comparison | No. 1 | 0 | Peeled off | cracked | piles fallen off | partially peeled off | Δ | dense |
| | No. 2 | 0 | peeled off | cracked | good | cracked | X | dense |
| | No. 3 | X | peeled off | good | good | cracked | 0 | dense |
| | No. 4 | X | peeled off | cracked | good | cracked | 0 | rough |
| | No. 5 | X | peeled off | cracked | good | cracked | 0 | rough |

corrosive synthetic resin layer containing 2 to 30 parts by weight of an anticorrosive pigmemt per 100 parts by weight of the resin with a thickness of 2 to 20 microns as a dried film on the surface of a metal sheet, (b) an elastic adhesive layer with a thickness of 50 to 500 microns as a dried film on a partial or the entire surface of said anticorrosive synthetic resin layer, and (c) flock-coated synthetic resin pile on said adhesive layer, applied by means of an electrostatic flock-coating machine.

2. A flock-coated metal sheet according to claim 1, in which the anticorrosive synthetic resin layer comprises at least one resin selected from the group consisting of epoxy resin, phenol resin, polyester resin, urethane resin, and at least one anticorrosive pigment selected from the group consisting of zinc chromate and strontium chromate.

3. A flock-coated metal sheet according to claim 1, in which the elastic adhesive layer comprises at least one selected from the group consisting of a styrene-butadiene type synthetic rubber adhesive, an emulsion type adhesive of a three-dimensional copolymer of ethylene, vinyl acetate and an ethylenic unsaturated acid.

* * * * *